(12) United States Patent
Yu et al.

(10) Patent No.: US 7,149,836 B2
(45) Date of Patent: Dec. 12, 2006

(54) GPRS REPLACEABLE MODULE COMMUNICATION DEVICE

(75) Inventors: Gordon Yu, Hsin Chu (TW); Forli Wen, Hsin Chu (TW); Jui-Chung Chen, Hsin Chu (TW)

(73) Assignee: C-One Technology Corporation, Hsinchu (TW)

( * ) Notice: Subject to any disclaimer, the term of this patent is extended or adjusted under 35 U.S.C. 154(b) by 287 days.

(21) Appl. No.: 10/798,989

(22) Filed: Mar. 12, 2004

(65) Prior Publication Data

US 2005/0202847 A1    Sep. 15, 2005

(51) Int. Cl.
G06F 13/00 (2006.01)
H05K 7/10 (2006.01)
H04B 1/38 (2006.01)
H04M 1/00 (2006.01)

(52) U.S. Cl. .............. 710/301; 710/302; 455/560; 455/561

(58) Field of Classification Search ........... 710/301, 710/302; 455/560, 561
See application file for complete search history.

(56) References Cited

U.S. PATENT DOCUMENTS

| | | | | |
|---|---|---|---|---|
| 4,909,742 A * | 3/1990 | Ohkubo et al. | ............ | 439/59 |
| 5,438,359 A * | 8/1995 | Aoki | ............ | 348/231.9 |
| 5,611,057 A * | 3/1997 | Pecone et al. | ............ | 710/301 |
| 6,092,133 A * | 7/2000 | Erola et al. | ............ | 710/301 |
| 6,381,662 B1* | 4/2002 | Harari et al. | ............ | 710/301 |
| 6,678,281 B1* | 1/2004 | Chakrabarti et al. | ........ | 370/438 |
| 6,755,343 B1* | 6/2004 | Cheng et al. | ............ | 235/380 |
| 6,769,045 B1* | 7/2004 | Tanaka et al. | ............ | 710/301 |
| 6,833,867 B1* | 12/2004 | Anderson | ............ | 348/231.9 |
| 6,892,263 B1* | 5/2005 | Robertson | ............ | 710/301 |
| 2004/0010648 A1* | 1/2004 | Durand et al. | ............ | 710/301 |
| 2004/0090539 A1* | 5/2004 | Kim et al. | ............ | 348/231.1 |
| 2005/0198424 A1* | 9/2005 | Harari et al. | ............ | 710/301 |

* cited by examiner

*Primary Examiner*—Rehana Perveen
*Assistant Examiner*—Faisal Zaman

(57) ABSTRACT

A GPRS replaceable module communication device includes a motherboard and a daughter board. The motherboard includes necessary components for enabling GPRS module operation and selecting module interface and setting, while the daughter board is a modularized add-on card whose function is determined by a replaceable module. The same GPRS motherboard can be used to accommodate different daughter boards for different functions, and the GPRS motherboard determines either to read the control data on the motherboard, or the control data on the daughter board by the insertion or removal of the daughter board.

7 Claims, 1 Drawing Sheet

GPRS REPLACEABLE MODULE COMMUNICATION DEVICE

FIELD OF THE INVENTION

The present invention relates to a GPRS (General Packet Radio Service) replaceable module communication device, and more particularly to a device that enables the GPRS communication module to provide different functions to meet different communication needs.

BACKGROUND OF THE INVENTION

Global System for Mobile Communication (GSM) is one of the most popular technologies in wireless data communication. On the other hand, Internet is the most popular choice for wired communication. Although both communication network systems were widely deployed, there was little data exchange between the two networks in the early age. This is because these two networks use different data exchange methods. While GSM uses circuit-switch for data exchange, Internet uses packet-switch for data transmission. It is difficult to conduct data exchange between the two networks.

General Packet Radio Service (GPRS) is a technology proposed for solving the above problem. The emergence of the technical standard of GPRS facilitates the data exchange between the two networks. GPRS is a new packet data transmission service based on GSM, with addition of new data exchange points in the current GSM network. As the new data exchange points are capable of processing packets, the GSM network can exchange data with Internet network. The convenience of GSM wireless transmission is added to the information-rich Internet for easy sharing.

The major difference between the GPRS and the GSM is that GSM is circuit-switching, while GPRS is packet-switching. Therefore, GPRS is suitable for discontinuous and bursty data traffic, or frequent and small amount data traffic. It is also suitable for occasional large amount data traffic.

The GPRS cards are generally used in mobile computers and PDAs as the means for wireless communication, so that they can be connected to Internet through mobile phones. A conventional GPRS card usually consists of a motherboard installed with mandatory components, such as a GPRS communication module and a battery set. Conventional GPRS cards also use a specific interface, such as Compact Flash, for interfacing other systems. However, as the GPRS card cannot be connected to the system unless a suitable interface is used, it usability is limited. Alternatively, a PC or a PDA can be used to complete the device, but it greatly increases the cost.

SUMMARY OF THE INVENTION

The first objective of the present invention is to provide a GPRS replaceable module communication device to increase the functionality of the conventional GPRS cards by module daughter boards of different functions.

The second objective of the present invention is to reduce the cost of GPRS application by modularizing functional components.

The present invention of a GPRS replaceable module communication device comprises a mother board with basic components, and a daughter board that can be connected to the mother board. The major characteristic of the present invention is that the daughter board is a modularized card with specific functions. The motherboard can detect the insertion or removal of the daughter board, and based on the presence of a daughter board to determine to read which board's control data.

The mother board of the present invention of a GPRS replaceable module communication device comprises a controlling multiplexer for controlling the access to the data on the daughter board. The controlling multiplexer can detect the insertion or removal of the daughter board, and based on the presence of a daughter board to determine to read which board's control data. The daughter boards with different functions can be used to increase the functions of the motherboard of the GPRS replaceable module communication device.

The present invention will become more obvious from the following description when taken in connection with the accompanying drawing which shows, for purposes of illustration only, a preferred embodiment in accordance with the present invention.

DETAILED DESCRIPTION OF THE PREFERRED EMBODIMENT

Figure 1:
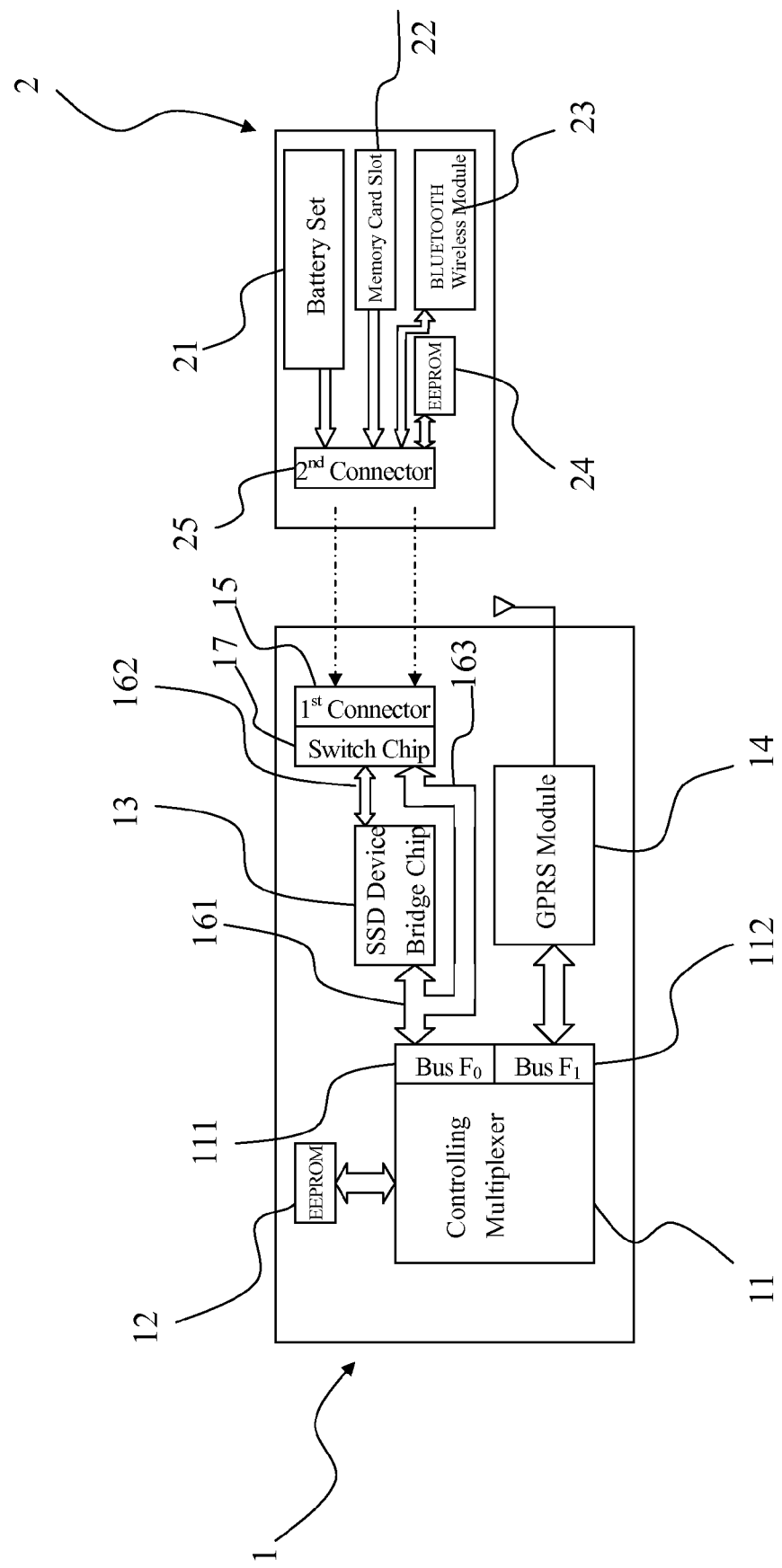
FIG. 1 shows a schematic diagram of a GPRS replaceable module communication device of the present invention.

FIG. 1 shows a schematic diagram of a GPRS replaceable module communication device of the present invention. The device of the present invention comprises a motherboard 1 and a daughter board 2. The motherboard 1 further comprises a controlling multiplexer 11, an electrically erasable programmable read only memory (EEPROM) 12, a solid state disk (SSD) device bridge chip 13, a GPRS module 14, and a first connector 15. The controlling multiplexer further comprises a bus $F_0$ 111, and a bus $F_1$ 112.

The daughter board 2 comprises an EEPROM 24, and a second connector 25. In addition, the daughter board 2 further comprises at least one of the following: a battery set 21, a memory slot 22 or a BLUETOOTH wireless (or a wireless LAN) module 23, in order to form a daughter board with different functions. Therefore, the daughter board 2 can have a combination of (a) a battery set 21, (b) a battery set 21 and a memory card 22, (c) a battery set 21 and a BLUETOOTH wireless module 23, (d) a battery set 21 and a wireless LAN card, (e) a battery set and a GPRS module, or other possible combinations. The memory card 22 includes, but not limited to, MMC, SD or MS memory card.

Before the daughter board 2 is connected to the motherboard 1, the operation on the motherboard 1 is determined by data stored in EEPROM 12, read in advance by the controlling multiplexer 11. The data is computed and the resulting commands are sent through the bus $F_1$ 112 to GPRS module 14, so that the GPRS can perform wireless transmission.

When a daughter board 2 with different modules are added to the motherboard 1, the data on the daughter board 2 can be transmitted to the motherboard 1 through the second connector 25 and the first connector 15. The motherboard 1 can detect the insertion or removal of the daughter board 2, and turn on and/or off the CS pin (not shown) of the EEPROM 12 to make the controlling multiplexer 11 select to read either the data stored in the EEPROM 12 on the motherboard 1, or the data stored in the EEPROM 24 on the daughter board 2.

The controlling multiplexer 11 can support many operation modes. For example, in mode 1, both bus $F_0$ and bus $F_1$ are connected to the universal asynchronous receiver/transmitter (UART). In mode 2, bus $F_0$ is connected to the programmed input/output (PIO), and bus $F_1$ is connected to the UART. In mode 3, bus $F_0$ is connected to the True IDE, and bus $F_1$ is connected to the UART. In mode 4, bus $F_0$ is disconnected, and bus $F_1$ is connected to the UART. In mode 5, bus $F_0$ is connected to the PIO, and bus $F_1$ is disconnected. In mode 6, bus $F_0$ is connected to the True IDE, and bus $F_1$ is disconnected. Modes 1, 2 and 3 are multi-function modes, while modes 4, 5, and 6 are single-function modes. The controlling multiplexer 11 can achieve the purpose of multiplexing by using different modules.

The data on the daughter board 2, for example, from the EEPROM 24, the memory card slot 22, or the BLUETOOTH wireless module 23, can be transmitted to the GPRS communication device for execution from first connector 15, controlling multiplexer 11 and bus $F_0$ 111 by two paths. One path is through the first connector 15, bus $B_2$ 162, SSD device bridge chip 13, bus $B_1$ 161, to controlling multiplexer 11. The other path takes the route of first connector 15, bus C 163, then directly to controlling multiplexer 11, and bypassing the SSD device bridge chip 13. The switch chip 17 is used for selecting the path to transmit data from the daughter board 2 to motherboard 1. The operation of the controlling multiplexer 11 to read either the control data on the EEPROM of the motherboard 1, or the control data on the EEPROM of the daughter board 2 is also executed by turning on or off the switch chip 17 according to the action of insertion or removal of the daughter board 2.

The main function of the SSD device bridge chip 13 is to transmit the data on the removable daughter board 2, such as SD, MMC, and MS, to the True Integrated Drive Electronic Interface (IDE). It serves the same purpose as the adaptor to the personal computer memory card international association (PCMCIA).

The main functions of the EEPROM 12, 24 include: (1) storing PCMCIA card information structure (CIS), and (2) storing a configuration value to configure the controlling multiplexer, in order to determine its operation mode. For example, the EEPROM 93C56 has 256 bytes, where bytes 00-EF store the CIS. The configuration values of the EEPROM 93C56 are as follows: in configuration 001, both bus $F_0$ and bus $F_1$ are set to the universal asynchronous receiver/transmitter (UART). In configuration 010, bus $F_0$ is set to the programmed input/output (PIG), and bus $F_1$ is set to the UART. In configuration 100, bus $F_0$ is set to the True IDE, and bus $F_1$ is connected to the UART. In configuration 101, bus $F_0$ is disconnected, and bus $F_1$ is set to the UART. Configurations 001, 010, and 100 are multi-function modes, while configuration 101 is single-function mode, and so on. That is, when power on, the data on the EEPROM 93C56 will be input to the controlling multiplexer. There will be 240 bytes of the CIS data stored in the RAM buffer, and the remaining 16 bytes are used to configure the controlling multiplexer. Then, the system host sends a reset signal to the card to determine the operation mode of the multi-function control card, followed by determining, based on the 240 bytes of CIS in the RAM buffer, which operating system the card will operate under. In other words, the functions of the chip is first determined by the 16-byte configuration values and the reset signal from the host, then the operating system to determine the functions of the card under WIN98/2K/CE operating systems.

While we have shown and described the embodiment in accordance with the present invention, it should be clear to those skilled in the art that further embodiments may be made without departing from the scope of the present invention.

What is claimed is:

1. A general packet radio service (GPRS) replaceable module communication device, comprising:
    a motherboard having GPRS components including at least a controlling multiplexer, a first bus connected to said controlling multiplexer, a second bus, a solid state disk (SSD) device bridge chip between said first and second buses, an electrically erasable programmable read only memory (EEPROM) interfaced with said controlling multiplexer, a third bus connected to said first bus, a GPRS module interfaced with said controlling multiplexer, a first connector and a switch chip for connecting either said second bus or said third bus to said first connector; and
    a daughter board having at least an EEPROM and a second connector for connecting to said first connector;
    wherein said motherboard determines to read control data stored in the EEPROM of said motherboard or control data stored in the EEPROM of said daughter board, and said switch chip controls transmission path of said control data of said daughter board to said controlling multiplexer.

2. The device as claimed in claim 1, wherein said daughter board further comprises at least one of the following three devices: a battery set, a memory card slot, and a BLUETOOTH wireless module.

3. The device as claimed in claim 1, wherein said control data of said daughter board is transmitted through said second connector on said daughter board, said first connector on said motherboard, said second bus, said SSD device bridge chip, and said first bus, to said controlling multiplexer.

4. The device as claimed in claim 1, wherein said control data of said daughter board is transmitted through said second connector on said daughter board, said first connector on said motherboard, and said third bus to said controlling multiplexer.

5. The device as claimed in claim 1, wherein the operation of said switch chip is determined by the action of insertion or removal of said daughter board.

6. The device as claimed in claim 1, wherein the operation of said controlling multiplexer to read either said control data on said EEPROM of said motherboard, or said control data on said EEPROM on said daughter board is executed by said switch chip.

7. The device as claimed in claim 6, wherein the operation of said switch chip is determined by turning on or off said switch chip through the action of insertion or removal of said daughter board.

* * * * *